April 3, 1956     E. PETRICH     2,740,527
FILTERING MASS CARRIER FOR FILTRATION PLANT
Filed July 22, 1952
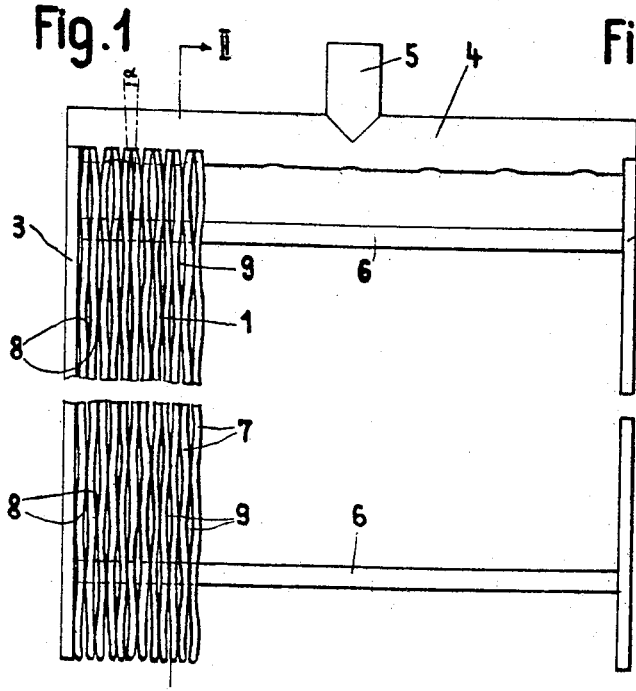
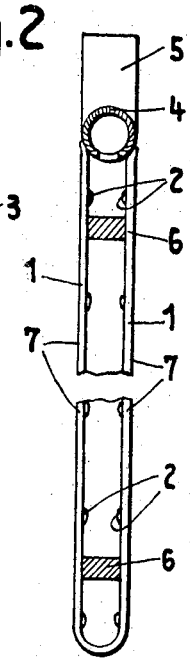
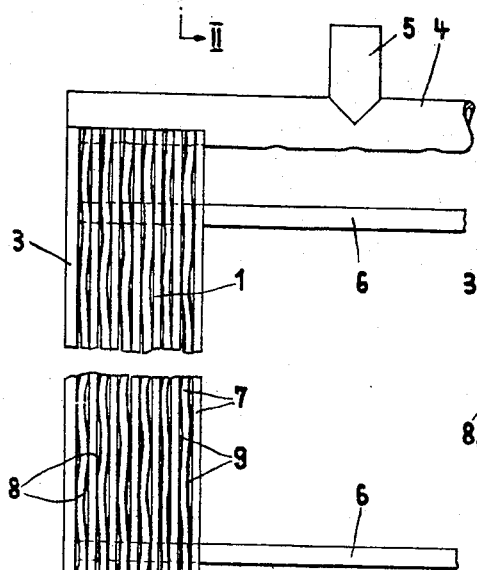
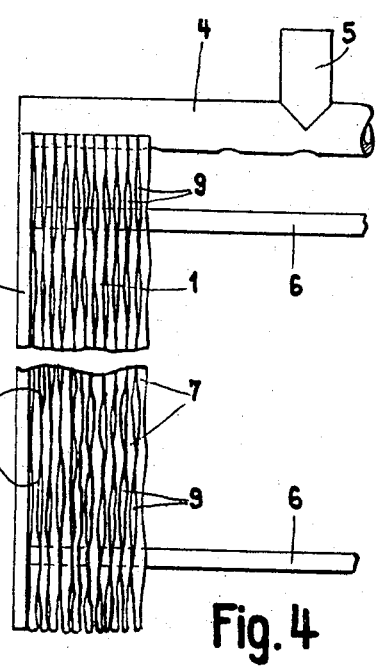
INVENTOR
ERWIN PETRICH
BY Edward T Connors
ATTORNEY

United States Patent Office 2,740,527
Patented Apr. 3, 1956

2,740,527

FILTERING MASS CARRIER FOR FILTRATION PLANT

Erwin Petrich, Augsburg, Germany, assignor, by mesne assignments, to Bohler & Weber K. G., Augsburg, Germany Application July 22, 1952, Serial No. 300,245

3 Claims. (Cl. 210—177)

This invention relates to filtering mass carriers for filtration plants as they are for instance used in chemical cleaning where a solvent is pumped through a filtration plant and a cleaning machine. The filtration plant serves the purpose of cleaning the solvent from dust, dirt, fatty substances etc. and comprises one or more filtering mass carriers lodged as insets in a filtering container. The filtering mass (such as kieselguhr or bleaching earth for instance) is deposited on these carriers in the shape of a cake by the solvent supplied under pressure.

Filtering mass carriers, whose carrying surface for the filtering cake consists of wires arranged side by side and standing upright when in working position, are well-known in the art. These wires are all straight and arranged parallel to one another at a very small distance from each other, so that the resistance to flow to the solvent and the working pressure to be produced by the pump are very high. If the distance of the parallel wires were increased for reducing the working pressure, the filtering mass to be accumulated would not have sufficient hold between two adjacent parallel wires, since one single continuous interspace would extend all over the total carrier height. The filtering mass would be forced through this interspace and no continuous filtering cake could be formed.

The filtering mass carrier according to the invention has also a carrier surface made from wires. However, its novel feature resides in that at least the one of every two adjacent wires is slightly corrugated in the carrying surface in such a way that the two adjacent wires form together a row of narrow slots.

The subdivision of the total carrier height between two wires into a number of narrow slots allows the passage area between two wires to be increased by suitably choosing the width of the slots, than with parallel straight wires, since the edges of the slots extending only over a portion of the total height of the wires offer sufficient hold to the filtering mass to prevent the mass from being forced through the slots by the solvent.

The accompanying drawing illustrates, by way of example, some embodiments of the invention.

Fig. 1 is a lateral elevation of a filter carrier,

Fig. 2 is a section along line II—II in Fig. 1 and

Figs. 3 and 4 are lateral elevations of filter carriers according to a second and a third example.

In all the illustrated embodiments, the filtering mass carrier forming an inset consists of a wire cage, the walls 1 of which are composed of wires 7 standing upright in working position of the inset. The outer surface of the walls 1 constitutes a carrying surface for the filtering mass which is deposited thereon as a filter cake. The wires 7 are welded together as at 2 on the inner side of the cage to give the cage sufficient rigidity. The welding seams lying inside the cage, the outer carrying surface is smooth and allows the filter cake to drop easily under the influence of its own weight as soon as the pressure in the filtration plant is removed and, therefore, the filter cake is no longer pressed onto the cage. The front ends of the cage are closed by walls 3, while an outlet tube 4 with a connecting piece 5 for the solvent closes the top of the cage. The bottom of the cage is formed by bent portions of the wires 7. The two walls 1 are interconnected by means of webs 6 to increase the rigidity of the inset.

In Fig. 1, the wires 7 forming the walls 1 are slightly corrugated in the drawing plane, that is, in the even carrying surface and are arranged side by side in such a way that every two adjacent wires form together a row of narrow slots 9. The length-width ratio of the slots 9 is chosen in such a way that the working pressure cannot press the filtering mass through the slots 9. As an example, this ratio may amount to 4:1, 8:1, 10:1 or more. A ratio higher than 10:1 is especially favorable. Not all the slots must necessarily have the same length and the same width. It is only essential that the slots are shaped in such a way that forcing the filtering mass through the slots by the working pressure is avoided and that the resistance to flow in the slots is as small as possible.

Both ends 8 of the slots 9 are pointed. The angles at the points of each slot are as small as possible and not larger than 5°, for instance. However, in certain cases, these angles may be larger than 5°. Also the inclination of the wire portions between the points 8 deviates as little as possible from the vertical, not more than 3°, for instance. In certain cases, this deviation may be larger than 3°. These small angles or deviations from the vertical respectively offer the advantage that the filtering mass to be accumulated on the carrier is at first deposited on the pointed ends 8 of the slots wherefrom it goes on covering gradually the entire slots 9. That is rendered possible because the filtering mass can firmly adhere to the wire portions forming the narrow slots and thus cannot be forced through the slots by the solvent.

The fact that the wire portions which, in working position, enclose an angle $\alpha$ with its vertex turned towards the bottom, deviate but slightly from the vertical offers the further advantage that in absence of the working pressure the filtering mass falls off these wire portions due to its own weight for the reason that the almost vertical wire portions do not offer sufficient support to the mass, so that it slides down. Therefore, the hitherto used devices for scraping the filtering mass off the carrier are no longer necessary and also manually scraping off can be dispensed with.

The example of Fig. 3 differs from that of Fig. 1 only in that every corrugated wire 7 is followed by a straight wire. All the other conditions are similar as described in relation to Fig. 1.

The wires can be corrugated in different ways. Under the term "corrugation" also a simple buckling or bending may be understood. so that the wire portions between two buckling or bending points are straight instead of curved. The corrugation can be obtained by drawing the wires through a wire-straightening machine comprising rotatable dressing jaws, for instance. In this way, also corrugation in a plane crossing the carrier surface is obtained and the wires are then shaped as an extremely stretched screw line.

The example of Fig. 4 differs from the former embodiments only in that each of the wires is corrugated by thickening and narrowing alternately along its length, while all the other conditions remain the same as described in connection with Fig. 1. In another embodiment, thickening and narrowing wires could alternate with straight cylindrical wires in order to obtain similar conditions as in Fig. 3.

Instead of being even, the walls 1 may be cylindrical or have any other shape.

What I claim is:

1. A self-cleaning filter for solvents used in chemical cleaning or the like comprising a supporting pipe having a plurality of inlet openings on its lower surface and an outlet opening on other than its lower surface, closed end walls for the pipe, a downwardly extending filter wall at each end of the pipe, at least one web holding the filter walls in position, and a plurality of U-shaped wire members extending from one side wall of the pipe downwardly to the lower end of the filter walls and returning to the other side wall of the pipe and forming a cage with the filter walls as sides and the pipe as a top, the wires welded together on a portion of the inner side of the cage, at least each alternate wire formed with a helicoidal contour thereby providing slots therebetween with pointed ends, the angular opening of the slots varying from zero degrees to about five degrees, whereby there is no projecting structure and in the absence of working pressure filtered material falls off the cage providing self-cleaning action.

2. A self-cleaning filter for solvents used in chemical cleaning or the like comprising a supporting pipe having a plurality of inlet openings on its lower surface and an outlet opening on other than its lower surface, closed end walls for the pipe, a downwardly extending filter wall at each end of the pipe, at least one web holding the filter walls in position, and a plurality of U-shaped wire members extending from one side wall of the pipe downwardly to the lower end of the filter walls and returning to the other side wall of the pipe and forming a cage with the filter walls as sides and the pipe as a top, the wires welded together on a portion of the inner side of the cage, at least each alternate wire formed with a helicoidal contour thereby providing slots therebetween with pointed ends, whereby there is no projecting structure and in the absence of working pressure filtered material falls off the cage providing self-cleaning action.

3. A self-cleaning filter for solvents used in chemical cleaning or the like comprising a supporting pipe having a plurality of inlet openings on its lower surface and an outlet opening on other than its lower surface, closed end walls for the pipe, a downwardly extending filter wall at each end of the pipe, at least one web holding the filter walls in position, and a plurality of U-shaped wire members extending from one side wall of the pipe downwardly to the lower end of the filter walls and returning to the other side wall of the pipe and forming a cage with the filter walls as sides and the pipe as a top, the wires welded together on a portion of the inner side of the cage, all of the wires formed with a helicoidal contour thereby providing slots therebetween with pointed ends, whereby there is no projecting structure and in the absence of working pressure filtered material falls off the cage providing self-cleaning action.

References Cited in the file of this patent

UNITED STATES PATENTS

| | | |
|---|---|---|
| 1,414,132 | Hurrell | Apr. 25, 1922 |
| 1,696,735 | Scobille | Dec. 25, 1928 |
| 1,867,397 | Brace et al. | July 12, 1932 |
| 2,006,405 | Monroe | July 2, 1935 |
| 2,049,336 | Stine | July 28, 1936 |
| 2,093,894 | Mojonnier | Sept. 21, 1937 |
| 2,132,770 | Weidenbacker | Oct. 11, 1938 |
| 2,434,807 | Little | Jan. 20, 1948 |

FOREIGN PATENTS

| | | |
|---|---|---|
| 636,693 | France | Apr. 14, 1928 |
| 922,154 | France | June 2, 1947 |
| 613,776 | Great Britain | Dec. 2, 1948 |